(No Model.)
R. H. WIDDICOMBE.
ELECTRIC CABLE TERMINAL.
No. 404,813. Patented June 4, 1889.
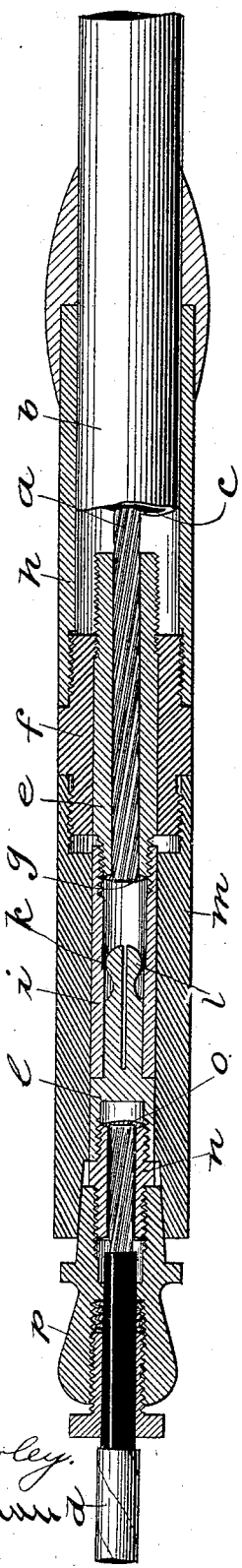
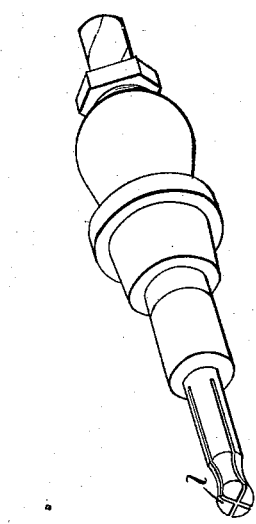
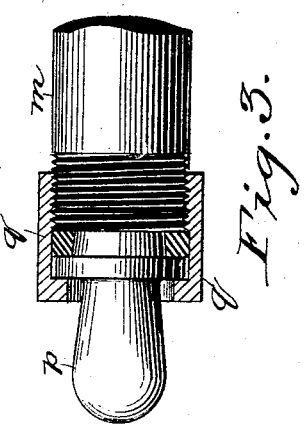
Witnesses:
Chas. G. Hawley.
Inventor
Robert H. Widdicombe.
By George P. Barton
Attorney.

UNITED STATES PATENT OFFICE.

ROBERT H. WIDDICOMBE, OF CHICAGO, ILLINOIS, ASSIGNOR TO THE WESTERN ELECTRIC COMPANY, OF SAME PLACE.

ELECTRIC-CABLE TERMINAL.

SPECIFICATION forming part of Letters Patent No. 404,813, dated June 4, 1889.

Application filed April 1, 1889. Serial No. 305,619. (No model.)

*To all whom it may concern:*

Be it known that I, ROBERT H. WIDDICOMBE, a citizen of the United States, residing at Chicago, in the county of Cook and State of Illinois, have invented a certain new and useful Improvement in Electric-Cable Terminals, (Case 3,) of which the following is a full, clear, concise, and exact description, reference being had to the accompanying drawings, forming a part of this specification.

My invention relates to electric-cable terminals, and is especially designed for electric-light cables or cables carrying currents which may be dangerous to life. These cables may consist of a single insulated conductor drawn in a lead pipe, the space between the conductor and the interior of the pipe being filled with paraffine or like insulating material, designed more especially to prevent water from flowing or penetrating for any considerable distance in the pipe in case the pipe should be broken or punctured.

The object of my invention is to provide a terminal connection for such cables of such construction that moisture may be kept away from the paraffine or other filling at the end of the cable, while the conductor is covered, so as to avoid the liability of accident in handling, and at the same time ready means afforded for connecting a kerite, gutta-percha, or other insulated conductor therewith.

My invention will be readily understood by reference to the accompanying drawings, in which—

Figure 1 is a detail sectional view of my terminal. Fig. 2 is a perspective view of the plug forming the terminal of a kerite wire. Fig. 3 is a modification.

As shown in Fig. 1, the conductor $a$ of the cable is inclosed in a lead pipe $b$, the space between the conductor and the interior of the pipe being filled with insulating material $c$. The conductor $d$ may consist of a flexible wire insulated with kerite, gutta-percha, or other suitable material. The lead-pipe cable, consisting of a core $a$, the pipe $b$, and the insulation $c$, is adapted to be laid under ground, while the conductor $d$ is more especially adapted to be suspended in the air.

In order that connection may be made with the underground cable and the overhead conductor, I have provided the terminal and terminal connections illustrated, which I will now describe in detail.

The end of the conductor $a$ being exposed, I place over the end thereof a metallic sleeve $e$, upon which sleeve $e$ is screwed the rubber coupling $f$. The end of the conductor $a$ being brought through the sleeve $e$, so as to be flush with the end thereof, is soldered thereto at $g$, thus forming a permanent electrical connection between the conductor $a$ and said sleeve $e$. The coupling $f$ is screwed into the end of a brass sleeve $h$, which is placed over the end of the lead pipe and united therewith by a wipe-joint. The metallic tube $i$ is then screwed to the end of sleeve $e$, as shown, this tube $i$ being provided with a shoulder $k$, which tends to hold the expansible plug $l$ in place when inserted therein, as shown. This tube $i$ is designed simply as a ready means for making connection between a plug and the conductor $a$. Over this tube $i$, I place a rubber coupling $m$, which completes my terminal. It will thus be seen that the insulation $c$ is thoroughly protected from moisture, and that the metallic connecting portion $i$ is covered, so as to prevent accidental contacts therewith. The terminal of the overhead wire is preferably a slotted plug provided with a rubber handle. The overhead conducting-wire is brought through the sleeve $n$ and soldered thereto, as shown at $o$. The shank or connecting-point of the plug is screwed over this sleeve. The rubber handle $p$ is screwed also over the other end of the sleeve $n$, as shown, a packing-box being provided in the handle, so that moisture cannot penetrate to the metal of the conductor. The cap $q$ may be screwed over the plug $p$ and the coupling $m$, as shown in Fig. 3.

Having thus described my invention, I claim as new and desire to secure by Letters Patent—

1. The combination, with the lead pipe of a telegraph-cable, of a sleeve $h$, secured thereto by a wipe-joint, a metal sleeve $e$ over the end of the conductor $a$ and soldered thereto at $g$, a rubber coupling $f$ between the sleeve $h$ and the sleeve $e$, the tube $i$, adapted to receive a plug screwed over the end of sleeve $e$, and the rubber coupling $m$, placed over the same, substantially as and for the purpose specified.

2. The combination, with the insulated conductor $d$, of the terminal plug, said plug being provided with a handle $p$, through which the conductor $d$ is inserted, packing being provided between the plug-handle and the insulating-covering of conductor $d$, said plug being inserted in a socket or tube $i$, substantially as and for the purpose specified.

In witness whereof I hereunto subscribe my name this 31st day of December, A. D. 1888.

ROBERT H. WIDDICOMBE.

Witnesses:
ELLA EDLER,
GEORGE P. BARTON.